(12) United States Patent
Robbin (10) Patent No.: US 10,179,342 B2
(45) Date of Patent: Jan. 15, 2019

(54) IMMERSION TREATMENT INSTALLATION (71) Applicant: Eisenmann SE, Böblingen (DE)

(72) Inventor: Jörg Robbin, Ammersbuch-Pfäffingen (DE)

(73) Assignee: EISENMANN SE, Boeblingen (DE)

( * ) Notice: Subject to any disclaimer, the term of this patent is extended or adjusted under 35 U.S.C. 154(b) by 0 days.

(21) Appl. No.: 14/379,121

(22) PCT Filed: Feb. 12, 2013

(86) PCT No.: PCT/EP2013/000401
§ 371 (c)(1),
(2) Date: Aug. 15, 2014

(87) PCT Pub. No.: WO2013/124039
PCT Pub. Date: Aug. 29, 2013

(65) Prior Publication Data
US 2015/0013598 A1    Jan. 15, 2015

(30) Foreign Application Priority Data
Feb. 21, 2012  (DE) .................. 10 2012 003 271

(51) Int. Cl.
B05C 13/02     (2006.01)
B05C 3/10      (2006.01)
(Continued)

(52) U.S. Cl.
CPC ............. B05C 13/02 (2013.01); B05C 3/10 (2013.01); B05C 11/08 (2013.01); B05D 1/18 (2013.01);
(Continued)

(58) Field of Classification Search
CPC .......... B05C 13/00; B05C 13/02; B05C 3/10; B05C 11/08; B65G 17/20; B65G 19/025; B65G 47/61; B05D 1/18
(Continued)

(56) References Cited

U.S. PATENT DOCUMENTS 5,058,508 A   10/1991  Kavieff et al.
6,419,983 B1   7/2002  Kreuzer
(Continued)

FOREIGN PATENT DOCUMENTS

CN    1636844 A     7/2005
DE    94 08 846     9/1994
(Continued)

OTHER PUBLICATIONS

English Machine Translation of German Document, DE 102010012534A1, Inventor Daniel Sluka, published Sep. 2011 (pp. 1-17; not numbered).*
(Continued)

*Primary Examiner* — Laura Edwards
(74) *Attorney, Agent, or Firm* — Schroeder Intellectual Property Law Group, LLC (57) ABSTRACT

An immersion treatment installation, which includes at least one immersion tank in a way known per se. A conveying system brings the items to be treated up to the immersion tank, into the space inside the immersion tank, out of it and away from it. The conveying system includes at least one transporting carriage, which has a carrying platform, which is pivotable about a pivot axis and to which at least one item can be fastened with the aid of a connecting structure. This connecting structure is movable on its own to such an extent that, with increasing pivoting from the unimmersed position,
(Continued)

the distance between the item and the pivot axis becomes increasingly greater under the influence of gravitational force.

12 Claims, 9 Drawing Sheets

(51) Int. Cl.
    *B05C 11/08*     (2006.01)
    *B05D 1/18*     (2006.01)
    *B65G 19/02*     (2006.01)
    *B65G 17/20*     (2006.01)
    *B65G 47/61*     (2006.01)

(52) U.S. Cl.
    CPC ............ *B65G 17/20* (2013.01); *B65G 19/025* (2013.01); *B65G 47/61* (2013.01)

(58) Field of Classification Search
    USPC ..... 198/465.4, 680; 118/423, 416, 428, 500, 118/501
    See application file for complete search history.

(56) References Cited

U.S. PATENT DOCUMENTS

| | | | |
|---|---|---|---|
| 6,571,970 B1 | 6/2003 | Spoeler | |
| 6,676,755 B2 | 1/2004 | Ehrenleitner et al. | |
| 6,991,087 B2 * | 1/2006 | Krannich | B05C 3/10 118/416 |
| 7,134,541 B2 | 11/2006 | Matsubara et al. | |
| 7,293,505 B2 | 11/2007 | Matsubara et al. | |
| 8,561,780 B2 | 10/2013 | Albeck et al. | |
| 2003/0056723 A1 | 3/2003 | Ehrenleitner et al. | |
| 2005/0061239 A1 | 3/2005 | Kyotani | |
| 2005/0139158 A1 | 6/2005 | Matsubara et al. | |
| 2006/0037535 A1 | 2/2006 | Weinand | |
| 2006/0249351 A1 | 11/2006 | Matsubara et al. | |
| 2007/0062060 A1 * | 3/2007 | Swoboda | B05D 3/067 34/275 |
| 2007/0212941 A1 | 9/2007 | Hisashi et al. | |
| 2010/0326832 A1 | 12/2010 | Albeck et al. | |
| 2011/0017132 A1 | 1/2011 | Robbin | |
| 2014/0021054 A1 | 1/2014 | Robbin | |

FOREIGN PATENT DOCUMENTS

| | | |
|---|---|---|
| DE | 94 08 874 | 9/1994 |
| DE | 43 26 563 | 2/1995 |
| DE | 196 41 048 C2 | 4/1998 |
| DE | 100 57 150 A1 | 5/2002 |
| DE | 10 306 826 | 4/2004 |
| DE | 102 61 337 | 7/2004 |
| DE | 101 03 837 B4 | 9/2005 |
| DE | 20 2008 017 770 U1 | 6/2010 |
| DE | 10 2010 012 534 A1 | 9/2011 |
| EP | 1 547 947 A | 6/2005 |
| EP | 1 741 646 | 1/2007 |
| GB | 2 217 348 | 10/1989 |
| GB | 2 224 252 | 5/1990 |
| JP | 59-137220 | 9/1984 |
| JP | 1-139410 | 5/1989 |
| JP | 1-129270 | 9/1989 |
| JP | 2-274486 | 11/1990 |
| JP | 3-3811 | 1/1991 |
| JP | 3-69567 | 7/1991 |
| JP | 6-135508 | 5/1994 |
| JP | 7-97009 | 4/1995 |
| JP | 2000-43712 | 2/2000 |
| JP | 2003-237567 | 8/2003 |
| JP | 2004-315837 | 11/2004 |
| JP | 2005-289102 | 10/2005 |
| WO | 2012/113506 A1 | 8/2012 |

OTHER PUBLICATIONS

Office Action from the State Intellectual Property Office in China dated Jul. 8, 2016 in related Chinese Patent Application No. 2013800100588, 9 pages.

* cited by examiner

IMMERSION TREATMENT INSTALLATION

RELATED APPLICATIONS

This application is a national phase of International Patent Application No. PCT/EP2013/000401, filed Feb. 12, 2013, which claims the filing benefit of German Patent Application No. 10 2012 003 271.4, filed Feb. 21, 2012, the contents of both of which are incorporated herein by reference.

FIELD OF THE INVENTION

The invention relates to an immersion treatment installation having
  a) at least one immersion tank, which can be filled with a treatment fluid, in particular paint, in which the objects to be treated, in particular vehicle bodies, can be immersed;
  b) a conveyor system, which can move the objects to be treated towards the immersion tank, into the interior of the immersion tank, out of the immersion tank and away from this and which comprises at least one transport carriage which can be moved in a translatory direction and has a carrying platform which is rotatable about an axis of rotation and to which at least one object can be fastened with the aid of a connecting structure.

BACKGROUND OF THE INVENTION

The fundamental problem with immersion treatment installations which operate with a conveyor system which has one or more transport carriages and can essentially be operated continuously relates to how the object to be treated can be lowered from the transport position, in which it is at a height above the level of the treatment fluid, so that it is fully immersed in the treatment fluid. To this end, various solutions are proposed:

In the immersion painting installation described in DE 196 41 048 C2, the conveyor system is designed so that the objects to be treated are immersed in, and removed from, the baths by superimposing a purely translatory movement and a purely rotational movement about an axis aligned perpendicularly to the transport direction. The axis of rotation here has to be relatively far outside the contour of the vehicle body and therefore far from its centre of gravity. In the case of objects which are very heavy, this requires highly complex holding points due to the very high forces produced. Moreover, only single kinematics are possible during the immersion and removal of the objects. Finally, immersion painting installations of this type have a relatively large spatial requirement in the vertical direction.

In the immersion painting installation known from DE 101 03 837 B4, each transport carriage comprises a pivot arm which can be pivoted at one end about a first axis of rotation moving with the transport carriage and which, at the other end, by way of a second axis of rotation, carries the fastening device to which the object to be painted is fastened. The movement by which the vehicle body is immersed in the immersion tank here can be seen as a superimposition of two rotational movements about the two said axes of rotation and a translatory linear movement in the horizontal direction. Much of the vertical movement here is generated from the pivotal movement of the pivot arm. This known immersion painting installation has an extraordinarily high variability in terms of the achievable movement kinematics as well as good flexibility. Nevertheless, it involves a certain degree of expenditure on apparatus.

An immersion treatment installation of the type mentioned at the outset is finally known from DE 20 2008 017 770.

In this, the carrying platform to which the vehicle body to be painted can be fastened can be moved in the vertical direction by way of a skid. The overall movement can be seen here as a superimposition of a linear movement in the translatory direction, a linear movement in the vertical direction and a rotational movement about the axis of rotation. The vertical movement is effected by a motor; the connecting structure between the object and the carrying platform is intrinsically rigid.

SUMMARY OF THE INVENTION

An object of the present invention is to design an immersion treatment installation of the type mentioned at the outset so that its construction is simpler and more economical and it requires relatively little expenditure on control systems.

This object may be achieved according to the invention in that
  c) the connecting structure is intrinsically movable in such a way that the object occupies a first non-immersed position in which it is at the smallest possible vertical spacing from the axis of rotation and in that, upon a rotation from this first position, the vertical spacing between the object and the axis of rotation continues to increase under the influence of gravity.

The invention differs from the previously universal concept of effecting the vertical components of the movement, which are required for immersion, by means of a corresponding motor-driven movement of the carrying platform. Instead, the present invention keeps the vertical position of the axis of rotation of the carrying platform constant and instead makes the connecting structure between the carrying platform and the object intrinsically movable. In the non-immersed position, gravity ensures that the connecting structure is collapsed and its dimensions in the vertical direction are as small as possible. Upon a rotation, however, gravity begins to extend the connecting structure without requiring a motor-driven action for this. There is no need for any expenditure on control systems. The vertical movement of the object takes place to a certain extent as a "by-product" of the rotational movement.

It is advantageous if, after a rotation through 180°, the object reaches a second position in which it is at a maximum vertical spacing from the axis of rotation.

In a particularly preferred embodiment of the invention, the connecting structure comprises at least two parallel connecting rods which are connected in articulated manner to the carrying platform by a first end and are connected in articulated manner to a holding structure for the object at their second ends in such a way that at least one parallelogram guide is produced. In this design, the parallelogram formed by the carrying platform, connecting rods and holding structure lies extremely flat in the non-immersed position whilst, in the second position following a rotation through 180°, it forms a rectangle and thereby maximises the spacing between the carrying platform and the holding structure and therefore the object.

An alternative embodiment of this idea is such that the object is carried by a skid having a base frame, with the connecting structure comprising at least two parallel connecting rods which are connected in articulated manner to the base frame of the skid by a first end and are connected in articulated manner to a holding structure for the object at their second ends in such a way that at least one parallelogram guide is produced. The capacity for the vertical movement here is therefore not intrinsic to the transport carriage itself, but to the skid which carries the object through the entire installation (and optionally in further parts of the automotive manufacturing plant).

In some cases, it is advantageous if a damping or braking device is present, which controls the internal movements of the connecting structure which take place under the influence of gravity. This should prevent jerky movements.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

Exemplary embodiments of the invention are explained in more detail below with reference to the drawing, which shows.

DETAILED DESCRIPTION OF THE PRESENT INVENTION

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

The cataphoretic immersion painting installation, which is denoted as a whole by the reference numeral 1 and described below with reference to the different Figures, is known in its basic structure from DE 20 2008 017 770, in particular from FIGS. 21 to 38 therein. Additional reference is made to this publication. Unless described otherwise below, the construction of the present cataphoretic immersion painting installation 1 corresponds to the known immersion painting installation. The corresponding structural features are summarised briefly as follows:

The cataphoretic immersion painting installation 1 comprises an immersion tank 2 filled with liquid paint. Vehicle bodies 3 are guided with the aid of a conveyor system 4 through the immersion painting installation 1 and in particular through the immersion tank 2 and the paint located therein. Anodes, which are not shown for reasons of clarity, are arranged along the movement path of the vehicle bodies 3. In an electric field which is established between the vehicle bodies 3 and the anodes, colour particles migrate towards the vehicle bodies 3 and are deposited thereon.

The conveyor system 4 comprises a plurality of transport carriages 5 which are described in more detail below. A drive rail 6 with an I-profile, as is used in conventional overhead conveyors, extends over the immersion tank 2.

Figure 1:
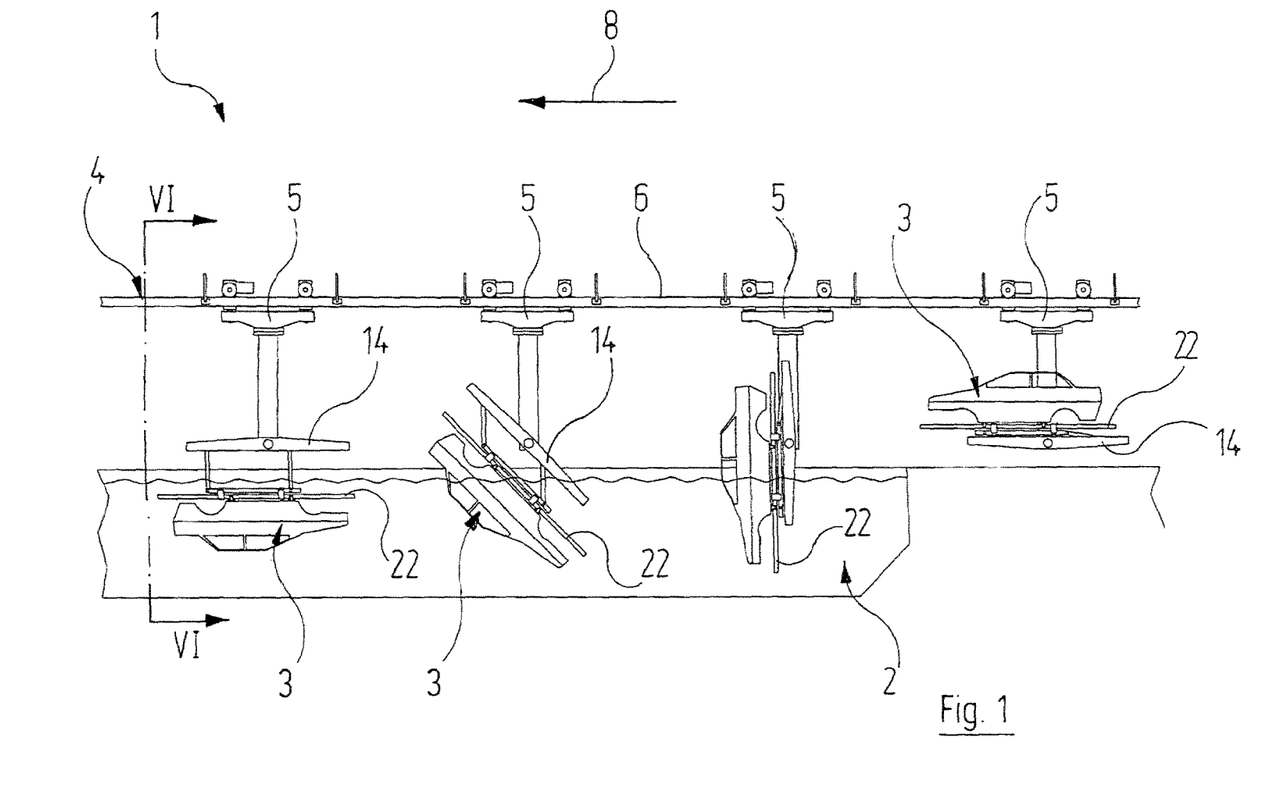
FIG. 1 a detail of a cataphoretic immersion treatment installation in a side view.

The movement direction in which the vehicle bodies 3 are conveyed with the aid of the conveyor system 4 is illustrated by an arrow 8 in FIG. 1. The drive rail 6 is offset outwards in relation to the centre of the immersion tank 2, in a direction perpendicular to the movement direction 8, so that it does not extend above the immersion tank 2. This is shown in particular in FIG. 6.

The transport carriage 5 is essentially a construction known from conventional overhead conveyors. Each of these transport carriages 5 has a chassis 9 which leads in the movement direction 8 and is known technically as a "front runner" and a further chassis 10 which trails in the movement direction 8 and is known technically as an "end runner". Front runners 9 and end runners 10 are equipped in known manner with guide and carrying rollers which are not provided specifically with reference numerals here and which roll along different faces of the I-shaped profile of the drive rail 6. At least one roller of the front runner 9 and the end runner 10, in the present case a roller of the front runner 9, serves as a drive roller and, to this end, can be rotated by an electric motor 11.

Front runners 9 and end runners 10 of each transport carriage 5 are connected to one another by a cross bar 12. The cross bar 12 is in turn in communication with a carrying platform 14 by way of a substantially vertically extending holding element 13. The carrying platform 14 is held in self-supporting manner on the holding element 13 by a rotary shaft 15 which defines an axis of rotation and is mounted in the lower region of the holding element 13. It is set in rotation at this end by a rotary drive which is not shown in detail and which extends through the interior of the hollow holding element 13.

Figure 6:
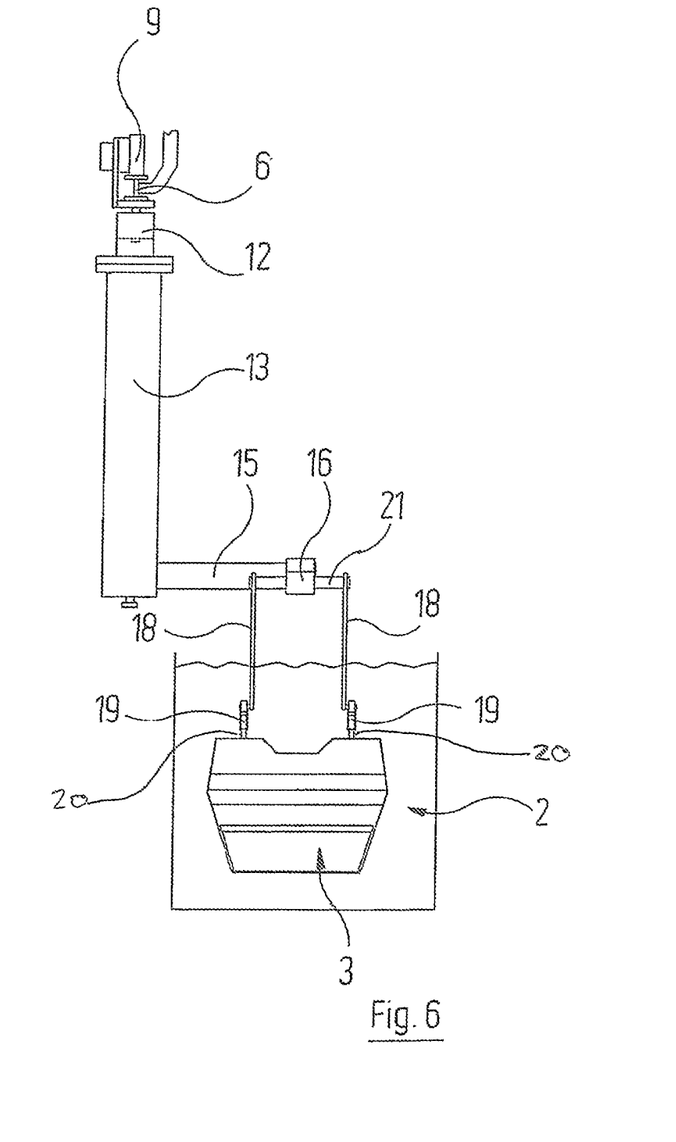
FIG. 6 a section according to line VI-VI of FIG. 1.

The arrangement is therefore such that the carrying platform 14 is located above the immersion tank 2 whilst the holding element 13 as well as the drive rail 6 are arranged to the side of the immersion tank 2 (cf. FIG. 6).

The outer end of the rotary shaft 15 is fastened with rotational fit to a longitudinal cross bar 16 of the carrying platform 14. The opposite ends of the longitudinal cross bar 16 are penetrated by two holding rods 21, on the opposite ends of which a respective connecting rod 18 is likewise rotatably connected in articulated manner (cf. FIG. 6). The ends of the connecting rods 18 which are remote from the holding rods 21 are likewise mounted in articulated manner on a holding structure 19. The holding structure 19 comprises two parallel struts 20 (cf. also FIG. 6) on which fastening elements (not shown) are mounted, which serve in known manner for fastening a skid 22 carrying a vehicle body 3. Connecting rods 18, holding structure 19, parallel struts 20, holding rods 21, and skid 22 collectively form a connecting structure.

The longitudinal cross bar 16 and the struts 20 of the holding structure 19 extend parallel in side view, as do the connecting rods 18. As a result, the longitudinal cross bar 16, the two pairs of connecting rods 18 and the holding structure 19 produce a double parallelogram guide.

Figure 2:
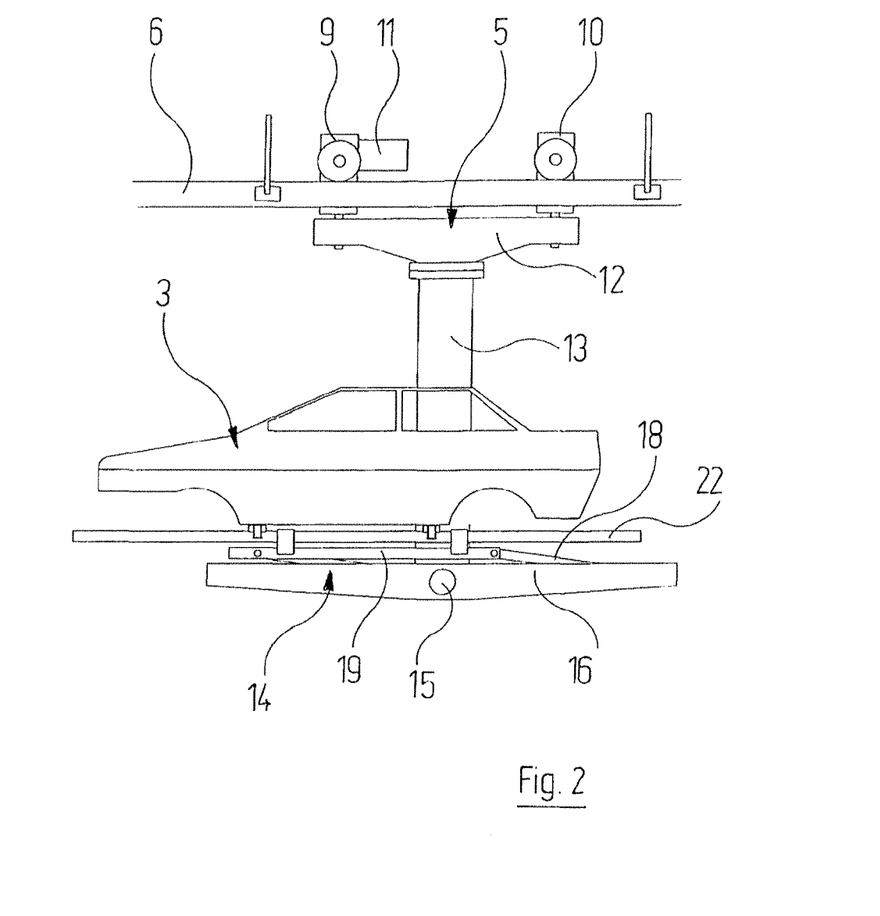
FIG. 2 as an enlargement of FIG. 1, a transport carriage with a vehicle body in a first position before immersion.

The mode of operation of the immersion painting installation 1 described above is as follows:

FIG. 2 shows that situation before the vehicle body 3 fastened to the carrying platform 14 is moved over the tank 2 in the transport direction 8. In this transport position, the above-mentioned parallelogram guides are "collapsed". This means that the connecting rods 18 are pivoted such that they extend substantially parallel to the longitudinal cross bar 16. The two struts 20 of the holding structure 19 are at an only marginally higher level than the longitudinal cross bar 16.

Figure 3:
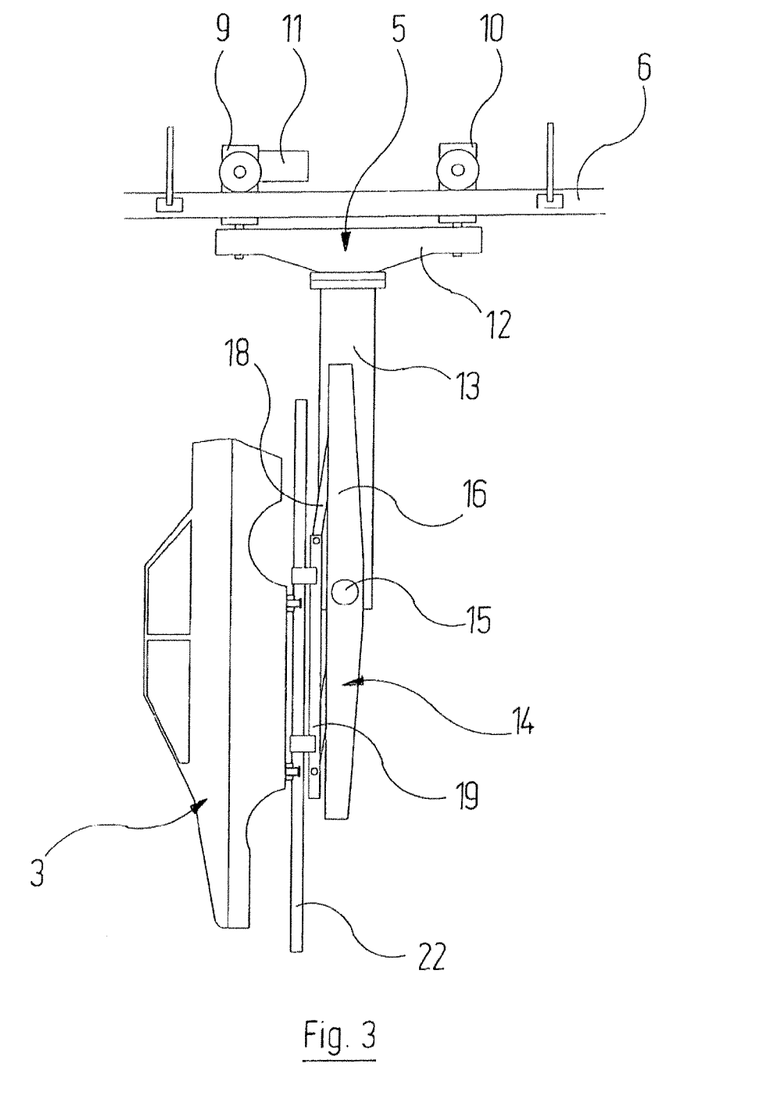
FIG. 3 a view, similar to FIG. 2, but in which the vehicle body is rotated through 90°.

During the further movement of the transport carriage 5, a rotation of the carrying platform 14 about the axis of rotation of the rotary shaft 15 is initiated. FIG. 3 shows that situation in which a 90° angle of rotation is reached. In this position, the vehicle body 3 is only immersed into the interior of the immersion tank 2 in its front region. The holding structure 19, like the longitudinal cross bar 16 of the carrying platform 14, is substantially vertical, with both structural elements still being in close proximity to one another.

Figure 4:
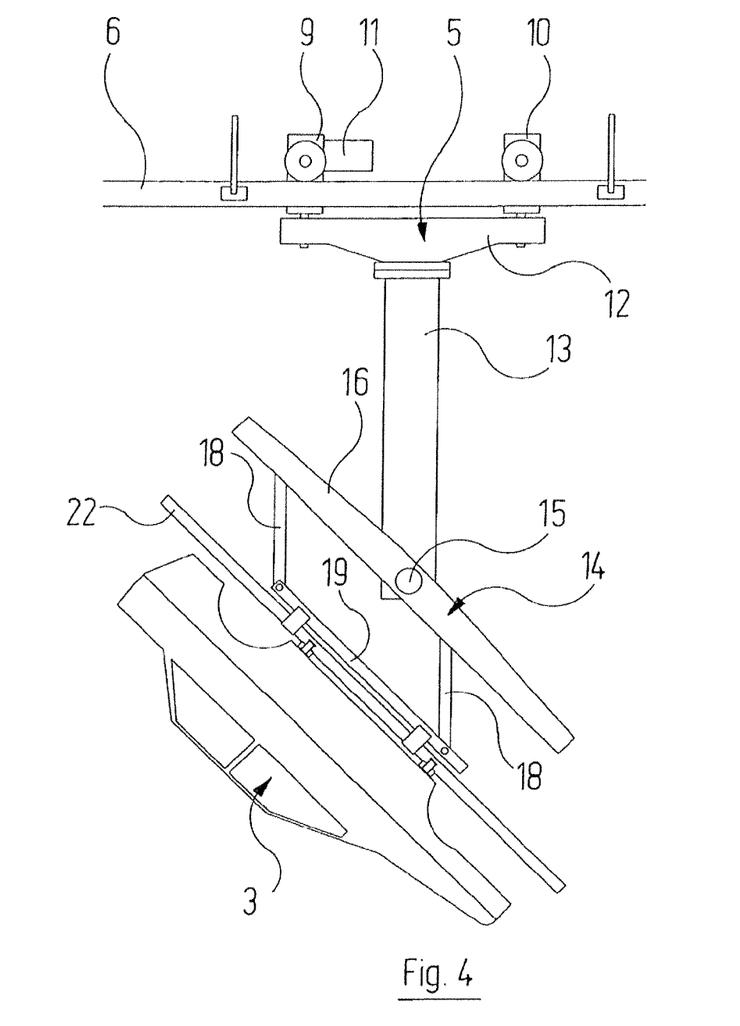
FIG. 4 a view, similar to FIGS. 2 and 3, but in which the vehicle body is rotated through 135° in relation to the starting position.

As the rotation now continues, as shown in FIG. 4 for an angle of 135°, the parallelogram guides on the carrying platform 14 begin to "extend". The connecting rods 18 are no longer parallel or at an acute angle to the longitudinal cross bar 16 and the carrying structure 19, but form a relatively large angle with these. This procedure is linked to the fact that the holding structure 19 is remote from the longitudinal cross bar 16 in the vertical direction. The vehicle body 3 is still not fully immersed in the immersion tank 2 in this position.

Figure 5:
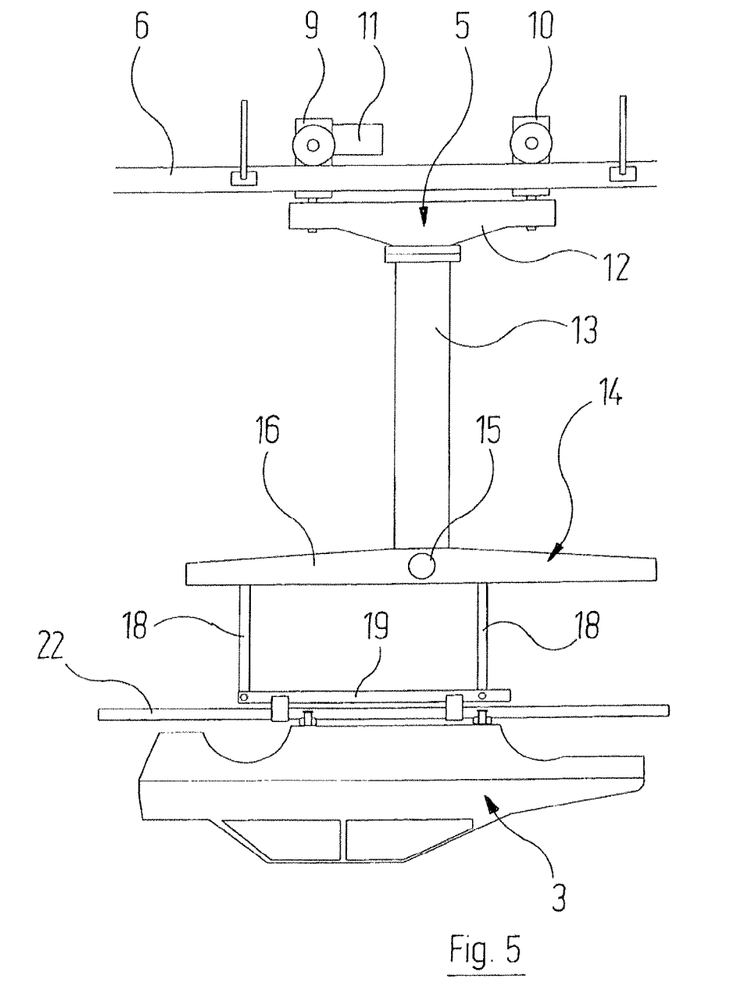
FIG. 5 a view, similar to FIGS. 2, 3 and 4, in which the vehicle body is rotated out of the starting position through an angle of 180°.

As the rotational movement continues, a 180° angle of rotation is finally reached, as shown in FIGS. 5 and 6. In this rotational position, the connecting rods 18 extend perpendicularly both to the longitudinal cross bar 16 and to the holding structure 19. The holding structure 19 is now at the greatest possible spacing from the longitudinal cross bar 16. The parallelogram guides are in the form of a rectangle. The vehicle body 3 is completely immersed and is lying "on its back".

All these procedures (of course with the exception of the rotational movement, which is driven by a motor) take place solely under the influence of gravity and therefore do not require an additional drive. If need be, it can be recommended for a brake or a damping mechanism to be provided, under the influence of which the "extension" of the parallelogram guides takes place in controlled manner.

The transport carriage 5 is now moved further in the movement direction 8, for which backward and forward pivotal movements of the carrying platform 14 are also possible. At the rear end of the immersion tank 2, as seen in the movement direction, the vehicle body 3 is removed from the immersion tank 2 again by a rotation through 180°, for example in the opposite direction of rotation. The parallelogram guides, which are formed by the longitudinal cross bar 16, the connecting rods 18 and the holding structure 19, "collapse" again, the vehicle body 3 again assumes the transport position illustrated in FIG. 2 on the transport carriage 5 and can then be transported away.

Figure 7:
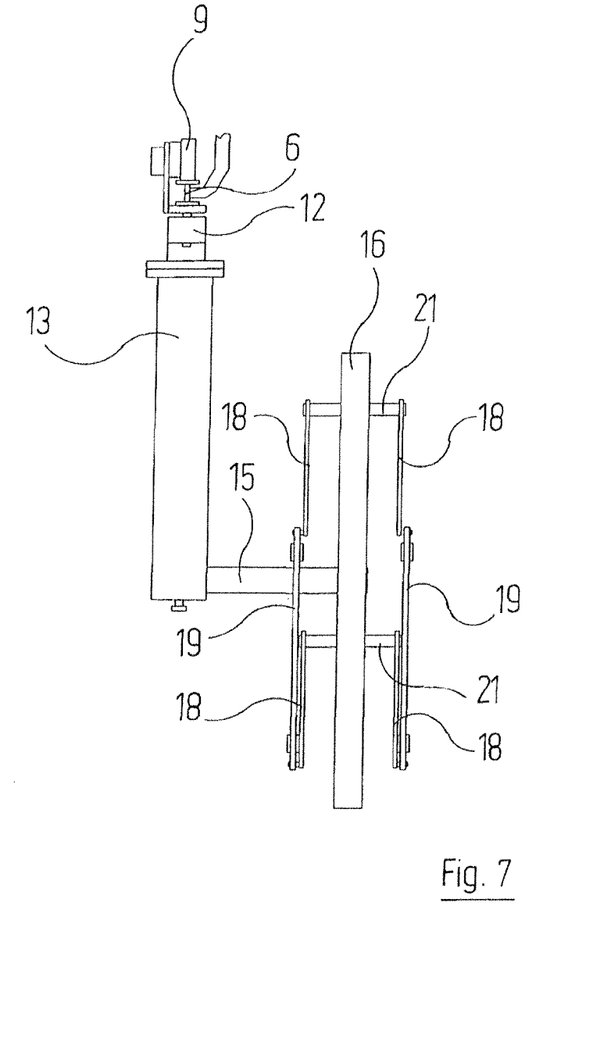
FIG. 7 a transport carriage for a vehicle body as used in the immersion treatment installation of FIGS. 1 to 5, and more precisely in an intermediate position before the return transport procedure.
Figure 8:
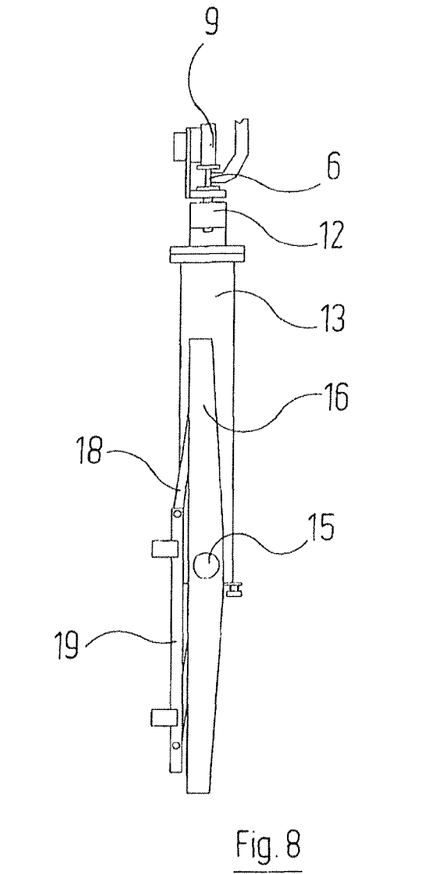
FIG. 8 the side view of the transport carriage of FIG. 7 in the position assumed for the return transport procedure.

At the end of the conveyor system 4, the vehicle bodies 3 are removed with the skids 22 from the transport carriages 5. To return the now empty transport carriages 5, the carrying platform 14 is positioned upright with the aid of the rotary shaft 15, as shown in FIG. 7. The entire carrying platform 14, the rotary shaft 15 and the holding part 13 are then rotated about a vertical axis with respect to the cross bar 12 of the transport carriage 5, so that the rotary shaft 15 comes to lie substantially parallel to the drive rail 6, below this latter. The entire transport carriage 5 then has very narrow dimensions as seen in the movement direction (cf. FIG. 8). The spatial requirement necessary for returning the empty transport carriage 5 from the unloading station to the loading station is therefore very small.

In the exemplary embodiment described above, the two parallelogram guides were formed by the longitudinal cross bars 16 of the carrying platform 14, the connecting rods 18 and the holding structure 19. The skid 22 to which the vehicle body 3 is fastened is an intrinsically rigid structure here. However, it is also possible to incorporate the skid in the formation of these parallelogram guides instead of the carrying platform 14. This is shown schematically in FIG. 9. Where components of FIG. 9 correspond to those of FIG. 5, there are denoted by the same reference numerals increased by 100, for example transport carriages 105, drive rail 106, chassis 109, further chassis 110, electric motor 111, cross bar 112 and substantially vertically extending holding element 113.

Figure 9:
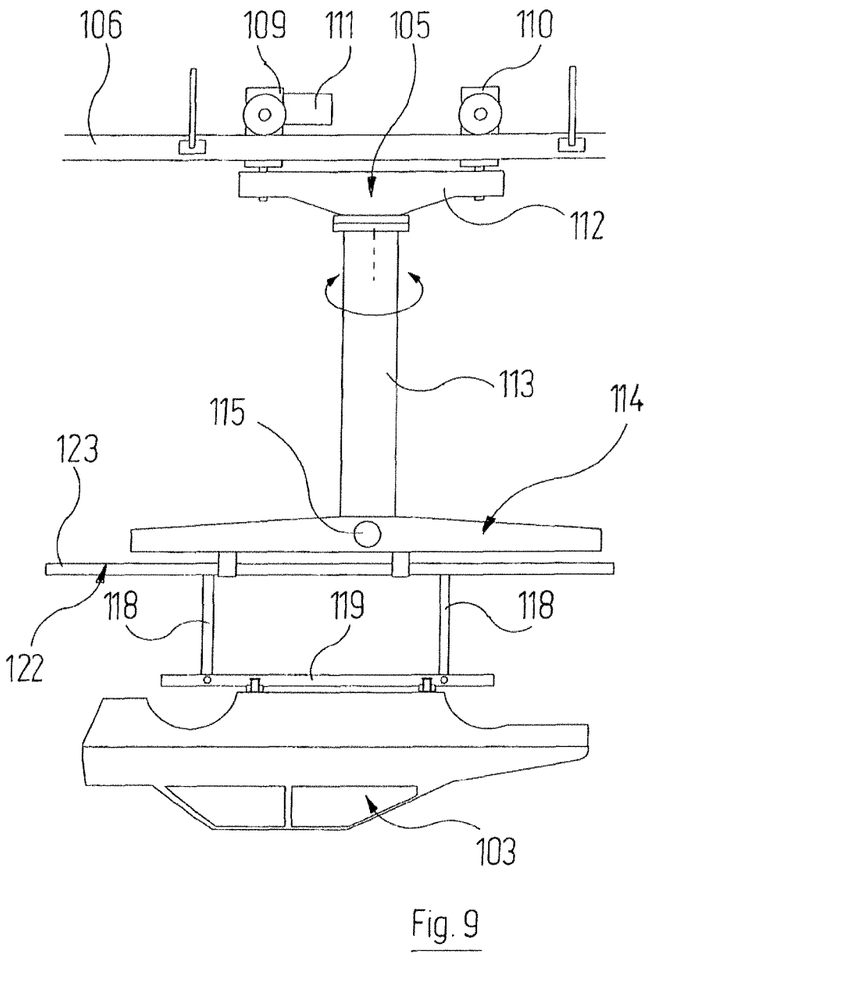
FIG. 9 a side view, similar to FIG. 5, of an alternative exemplary embodiment of a transport carriage on which a vehicle body is loaded.

The skid 122 has a base frame 123. Similar to the way in which the holding structure 19 of the first exemplary embodiment is connected to the longitudinal cross bar 16, a holding structure 119 is connected to the base frame 123 of the skid 122 by way of connecting rods 118 mounted in articulated manner. The vehicle body 103 is fixed to this holding structure 119. As the carrying platform 114 rotates, the holding structure 119 carrying the vehicle body 103 swings out of the base frame 123 of the skid 122, likewise creating an additional vertical spacing between the axis of rotation 115 of the carrying platform 114 and the vehicle body 103 and thus enabling the immersion of the vehicle body 103.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. An immersion treatment installation comprising:
    a) at least one immersion tank, which can be filled with a treatment fluid in which objects to be treated can be immersed;
    b) a conveyor system, which can move the objects to be treated towards the at least one immersion tank, into an interior of the at least one immersion tank, out of the at least one immersion tank and away from this, and which comprises at least one transport carriage which can be moved in a translatory direction and has a carrying platform which is rotatable about an axis of rotation and to which at least one object can be fastened with the aid of a connecting structure; and wherein
    c) the connecting structure is intrinsically movable in such a way that the at least one object occupies a first non-immersed position in which it is at the smallest possible vertical spacing from the axis of rotation and in that, upon a rotation from this first position by a rotary drive, the vertical spacing between the at least one object and the axis of rotation continues to increase under the influence of gravity as the object moves through a plurality of immersed positions until the at least one object reaches a maximum vertical spacing from the axis of rotation in a second position, wherein the vertical spacing between the at least one object and the axis of rotation continues to decrease under the influence of gravity as the at least one object moves through a plurality of positions returning to the first position from the second position, reaching the smallest possible vertical spacing when the at least one object returns to the first position.

2. An immersion treatment installation according to claim 1, wherein, after the carrying platform is rotated 180°, the at least one object reaches the second position in which the object is at a maximum vertical spacing from the axis of rotation.

3. An immersion treatment installation according to claim 1, wherein the connecting structure comprises at least two parallel connecting rods which are each connected in articulated manner to the carrying platform at a first end and are connected in articulated manner to a holding structure for the at least one object at a second end in such a way that at least one parallelogram guide is produced.

4. An immersion treatment installation according to claim 1, wherein the at least one object is carried by a skid having a base frame, with the connecting structure comprising at least two parallel connecting rods, which are each connected in articulated manner to the base frame of the skid at a first end and are connected to a holding structure for the object at a second end in such a way that at least one parallel guide is produced.

5. An immersion treatment installation according to claim 2, wherein the connecting structure comprises at least two parallel connecting rods which are each connected in articulated manner to the carrying platform at a first end and are connected in articulated manner to a holding structure for the at least one object at a second end in such a way that at least one parallelogram guide is produced.

6. An immersion treatment installation according to claim 2, wherein the at least one object is carried by a skid having a base frame, with the connecting structure comprising at least two parallel connecting rods, which are each connected in articulated manner to the base frame of the skid at a first end and are connected to a holding structure for the object at a second end in such a way that at least one parallel guide is produced.

7. An immersion treatment installation according to claim 2, wherein a damping or braking device is present, which controls the internal movements of the connecting structure which take place under the influence of gravity.

8. An immersion treatment installation according to claim 3, wherein a damping or braking device is present, which controls the internal movements of the connecting structure which take place under the influence of gravity.

9. An immersion treatment installation according to claim 4, wherein a damping or braking device is present, which controls the internal movements of the connecting structure which take place under the influence of gravity.

10. An immersion treatment installation according to claim 1, wherein a damping or braking device is present, which controls the internal movements of the connecting structure which take place under the influence of gravity.

11. An immersion treatment installation according to claim 5, wherein a damping or braking device is present, which controls the internal movements of the connecting structure which take place under the influence of gravity.

12. An immersion treatment installation according to claim 6, wherein a damping or braking device is present, which controls the internal movements of the connecting structure which take place under the influence of gravity.

* * * * *

UNITED STATES PATENT AND TRADEMARK OFFICE
CERTIFICATE OF CORRECTION

PATENT NO. : 10,179,342 B2
APPLICATION NO. : 14/379121
DATED : January 15, 2019
INVENTOR(S) : Robbin It is certified that error appears in the above-identified patent and that said Letters Patent is hereby corrected as shown below:

On the Title Page

Item (72)   Please delete the city of the inventor from "Ammersbuch-Pfäffingen" and insert instead -- Ammerbuch-Pfäffingen --.

Signed and Sealed this
Thirtieth Day of April, 2019

Andrei Iancu
*Director of the United States Patent and Trademark Office*